(12) United States Patent
Bachmann (10) Patent No.: US 6,709,245 B2
(45) Date of Patent: Mar. 23, 2004

(54) REGULATED PUMP

(75) Inventor: Josef Bachmann, Obersinn (DE)

(73) Assignee: GKN Sinter Metals GmbH (DE)

( * ) Notice: Subject to any disclaimer, the term of this patent is extended or adjusted under 35 U.S.C. 154(b) by 0 days.

(21) Appl. No.: 10/302,140

(22) Filed: Nov. 22, 2002

(65) Prior Publication Data

US 2003/0113217 A1 Jun. 19, 2003

Related U.S. Application Data

(63) Continuation of application No. PCT/EP01/05902, filed on May 22, 2001.

(30) Foreign Application Priority Data

May 25, 2000 (DE) .......................................... 100 25 723

(51) Int. Cl.$^7$ ................................................ F04B 49/00
(52) U.S. Cl. .................... 417/310; 417/283; 418/78; 415/110
(58) Field of Search ................. 417/310, 283; 123/196 R, 198 C; 418/171, 166, 74, 78, 180; 415/110

(56) References Cited

U.S. PATENT DOCUMENTS

| | | | | |
|---|---|---|---|---|
| 3,146,720 A | * | 9/1964 | Henry | 417/310 |
| 3,824,041 A | * | 7/1974 | Rystrom | 417/310 |
| 4,553,512 A | * | 11/1985 | Showman | 123/196 S |
| 5,013,220 A | * | 5/1991 | Nakagawa et al. | 417/310 |
| 5,085,187 A | * | 2/1992 | Black | 123/196 R |

FOREIGN PATENT DOCUMENTS

| | | |
|---|---|---|
| DE | 24 60 968 | 7/1976 |
| DE | 196 46 359 A1 | 5/1998 |
| EP | 0 301 886 A2 | 2/1989 |
| FR | 2 667 676 | 4/1992 |
| FR | 2 706 541 | 12/1994 |

* cited by examiner

*Primary Examiner*—Justine R. Yu
*Assistant Examiner*—Han L Liu
(74) *Attorney, Agent, or Firm*—Woodcock Washburn LLP (57) ABSTRACT

The invention relates to a pump, in particular to oil pumps for internal combustion engines comprising a gear assembly or rotor assembly with one each of a pressure and suction region arranged in a pump housing, which may be sealed from each other by means of an axially displaceable piston valve which defines a supply chamber and a housing cover, closing the pump housing. The pressure region comprises a pressure channel connected to the waist of the control piston, whereby the control piston cooperates with a plunger on the end thereof facing the supply chamber, which is arranged at right angles to the control piston. The plunger is pretensioned against the control piston by means of a pressure spring, and the plunger and control piston are connected by means of a sliding surface, arranged at an angle to the control piston axis.

26 Claims, 4 Drawing Sheets

REGULATED PUMP

This is a continuation of PCT/EP01/05902, filed May 22, 2001, which claims priority to German Serial No. 100 25 723.2, filed May 25, 2000.

BACKGROUND OF THE INVENTION

The invention relates to a pump, in particular an oil pump for internal combustion engines comprising a gear assembly or a rotor assembly, each having a pressure and a suction region arranged in a pump housing. The pressure and suction regions are insulated from each other with the help of an axially displaceable control piston that limits/defines a supply chamber and a housing cover that closes the pump housing. The pressure region has a pressure channel that is connected to the waist of the control piston.

The development of automobiles with low fuel consumption presupposes the optimization of vehicle and engine components. For the fuel consumption of automobiles in frequently encountered short stretches of dense traffic and city traffic, of particular significance are the losses that are conditioned among other things by the drive of supplementary systems. The drive efficiency of among others, oil pumps that ensure lubrication of the engine, can actually lead to a lowering of engine efficiency, causing the fuel consumption to increase sharply.

Up to −40° C., the function of engine lubrication, and sufficiently fast engine lubrication must be ensured. And in hot idle run operation up to 160° C., the oil supply must be totally fault-proof. The hot idle run operation is characterized by high inner leakages in the oil pump and a relatively high oil requirement of the engine. The hot idle run operation is an essential operational point for fixing the dimensions of the oil pump.

In general, in the classical pump design, the oil pump is most suitable for this operational point. In normal vehicle operation, this leads to an oversized oil pump, because the oil feed characteristic curve runs digressively in relation to the vehicle speed. The consequence is that the supply characteristic curve of the oil pump climbs almost in linear proportion to the speed.

The excess supply of oil resulting there from is blown out through an excess pressure-regulating valve, in a manner that consumes more energy. From DE A 196 46 359, we have knowledge about a lubrication pump controlled through volumetric efficiency, that enables an improved matching of the supply characteristic curve of the oil pump with the oil feed characteristic curve of the internal combustion engine. When the threshold pressure is exceeded in the pressure region, a control piston pre-tensioned through the pressure spring, which separates the pressure region and the suction region from each other, is displaced in the rear direction, thus creating an axial play. The axial play enables a pressure balancing from the pressure region to the suction region. This way, there is a reduction in the supply volume and the pressure, so that the supply characteristic curve of the oil pump comes closer to the oil feed characteristic curve of the engine.

SUMMARY OF THE INVENTION

The task of the invention is to design a pump that enables a more precise matching of the supply characteristic curve with the oil feed characteristic curve of the engine. With increasing speed in particular, the pressure and the volumetric flow of the pump are kept near constant from a regulation point. In addition, the pump should also have a lower intake.

The problem is resolved by the invention in that the control piston works in tandem with a plunger arranged at the control piston end facing the supply chamber. The plunger is aligned at right angles to the control piston. The plunger is pre tensioned against the control piston with the help of a pressure spring. The control piston and the plunger are connected through a sliding surface aligned at an angle to the control piston axis.

An advantage of the invention is that the oblique surface enables the pre-specification of a certain path/distance ratio between the control piston and the plunger. The pressure and supply volumes of the pump increase up to the regulation point almost in a linear relation. From a threshold speed of the regulation point onwards, it is desirable that the pressure and supply volumes remain near constant in relation to speed.

Other advantages of the pump conforming to the invention are that the pulsation is reduced, and less frothing of the medium, especially of the oil takes place.

In the pump conforming to the invention therefore, there is a provision that the regulation point of the pump can be adjusted through the pre-tensioned pressure spring of the plunger. When the threshold speed is exceeded, the threshold pressure is also exceeded, so that the pressure from the pressure region forces the supply medium to impact against the waist of the control piston through the pressure regulation channel, causing the control piston to move in the backward direction against the pressure spring. The rear movement of the control spring increases the axial play.

Simultaneously, the housing cover has a pressure channel that connects the pressure region and the supply chamber. Pressure is applied on the supply chamber in a controlled manner through the pressure channel built in the housing cover. This way, the supply chamber filled earlier in the suction region is replaced with supply medium in a controlled manner from the pressure region through the pressure channel, and the excess supply medium can flow back into the suction region through the enlarged axial play, i.e., through a withdrawal of the control piston, or remain in the suction region. Additionally, the supply medium can flow back directly through the enlarged axial play from the pressure region to the suction region.

This way, the efficiency of the pump is simultaneously reduced so that the pressure and volume flows remain constant. The precondition is that the displacement of the control piston, which corresponds to the enlargement of the axial play, should have a certain relationship to the reduction of pump efficiency. The rear displacement of the control pump should be bigger than the length of the pressure spring, so that pressure and volume flows from the regulation point can be kept constant.

The control piston has an oblique surface aligned at an angle of 30° to the control piston axis. Similarly, the plunger has an oblique surface aligned at an angle of 60° to the axis of the plunger. Thus, a displacement ratio of 2:1 can be established. It is meaningful and expedient, if the angle α between the oblique surface of the control piston and the control piston axis has a value of 10° to 80°, and the angle β between the oblique surface of the plunger and the plunger axis corresponds to 90°−α. It is possible to achieve a convenient displacement ratio through a corresponding expansion of the oblique orientation of the control piston and the plunger, leading to a matched control characteristic of the pump.

A preferred embodiment of the invention has the provision that the sliding surface is designed as a curve. A further improvement in the control characteristic is achieved through a suitable design of the curve. For example, the surface of the control piston can be designed as convex so that with increasing speed, an over proportional enlargement of the axial play takes place, and hence, the supply characteristic curve can be matched optimally to the oil feed characteristic curve.

In a preferred embodiment of a pump conforming to the invention, there is the provision that the end of the control piston facing the supply chamber impacts against a spring with a non-linear characteristic curve. It is expedient, if the spring has a digressive characteristic curve. While a cylindrical pressure spring has a progressively climbing characteristic curve, the use of a spring with non-linear spring characteristic curve, particularly a digressive spring characteristic curve can improve the enlargement of the axial play in relation to increasing speed, and thus, in relation to increasing pressure.

In a preferred embodiment of a pump conforming to the invention, the spring is designed as feather spring or plate spring. The range of design possibilities for the feather spring is so large that an exact matching of the control characteristic is possible.

A further advantage is that the use of a feather spring or a plate spring permits a flat and ergonomic structure of the pump. Other types of springs that have a similar characteristic curve can also be used.

In a preferred embodiment of the invention, the control piston has a ring groove. In its withdrawn position, the control piston is connected to bypass channels that originate from the pressure region and the suction region. The bypass is closed in the initial position of the control piston. When the threshold pressure is exceeded, the control piston moves backwards. For a definite period, the ring groove on the surface of the control piston is in connection with the bypass channels originating from the pressure region and the suction region, so that the supply medium can flow back from the pressure region to the low-pressure region, i.e. to the suction region without any hindrance. This way, the volumetric efficiency of the pump can be reduced in a controlled manner additionally.

In a preferred embodiment of the invention, the housing cover has a pressure channel that connects the pressure region to the supply chamber. Pressure can be applied in a controlled manner on the supply chamber through the pressure channel in the pump cover. The pressure channel connects the pressure region with the supply chamber, so that the supply chamber is filled partly with supply medium from the pressure region. When the axial play is enlarged, or when the control piston moves back, the supply medium can flow back into the suction region, or it stays in the suction region This means that only that much supply medium is pumped as is required by the oil feed characteristic curve of the engine.

In a preferred embodiment of the invention, the pressure channel that connects the pressure region to the supply chamber can be blocked or regulated. For example, the pressure channel remains closed up to a certain speed and opens fully or partially only to enable a pressure balancing from the pressure region to the suction region.

Further, the pressure regulation channel is also designed in such a way that it can be blocked or regulated.

In a preferred embodiment of the invention, the control piston has a wear proof surface. In particular, the sealing surface of the control piston facing the supply chamber is exposed to very high wear and tear. This results in an undesirable efficiency reduction for sealing bars of conventional pumps. The spring pressure of the plunger presses the control piston lightly, leading to a complete compensation/balancing.

In a preferred embodiment of the invention, each side of the gear assembly or the rotor assembly is provided with a control piston. The use of the second control piston on the side opposite to the first control piston enables a further improvement in the regulation of the pump. This is because the second control piston can be equipped with a spring that has a different characteristic curve than the spring of the first control piston. Further, it is possible to equip the second control piston with a spring that becomes effective only after the regulation point.

A further advantageous solution to the problem is achieved through a preferred embodiment of a pump, particularly an oil pump for internal combustion engines with a gear assembly or a rotor assembly, each comprising a pressure region and a suction region arranged in a pump housing. The pressure region and the suction region can be sealed from each other firmly with the help of a radially displaceable sliding block that limits/defines a supply chamber, and a housing cover that closes the pump housing. The pressure region has a pressure channel that is connected to the waist of the hydraulic piston. The hydraulic piston works in tandem with a sliding block at the end of the hydraulic piston facing the supply chamber, and the hydraulic piston is pre tensioned through a pressure spring.

It is possible to provide the improvement possibilities of the control characteristic also for regulating the hydraulic piston.

Further, it is possible to regulate the displacement of the control piston through a translator/actuator, so that, for example, these can be regulated with the help of a pressure sensor or volume flow measuring instrument, and thus enable the displacement of the control piston as a function of the determined measurement values. The regulation can, for example, be integrated in the engine management or in the gear regulation. The advantage is that the regulation of the supply volume through characteristic curves can be matched precisely to the concerned demand of the consumer of the pump. Examples for translators/actuators are electric servo drives (engine, gear and position measurement with feedback to the regulation), electro magnetic drives, Piezo crystal actuators, thermal actuators, hydraulic adjustable pistons and pneumatic cylinders.

The plunger can be aligned to the control piston at a suitable angle. A correspondingly adapted surface is necessary here.

Pumps conforming to the invention include among others—rotor pumps, toothed rotor assembly pumps, spur wheel pumps, sickle/crescent cell pumps and winged cell pumps.

The regulation system conforming to the invention can also be used to regulate a hydro engine.

BRIEF DESCRIPTION OF THE DRAWINGS

The invention has been explained with the help of schematic drawings/diagrams of execution models as follows.

DESCRIPTION OF PRESENTLY-PREFERRED EMBODIMENTS

Figure 1:
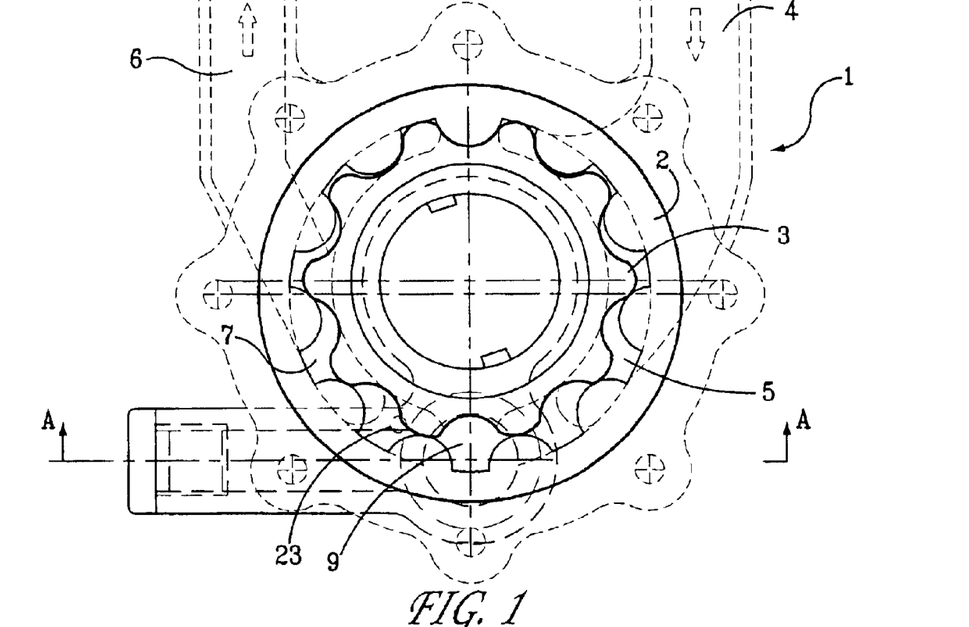
FIG. 1 is a top view of a pump.

FIG. 1 shows a top view of a preferred embodiment of a pump 1, particularly an oil pump for internal combustion engines having a rotor assembly designed as a gerotor comprising an outer rotor 2 and an inner rotor 3. The pump 1 has a flow inlet 4 to a suction region 5 and a flow outlet 6 to a pressure region 7. Both regions are shaped like kidneys.

Figure 2:
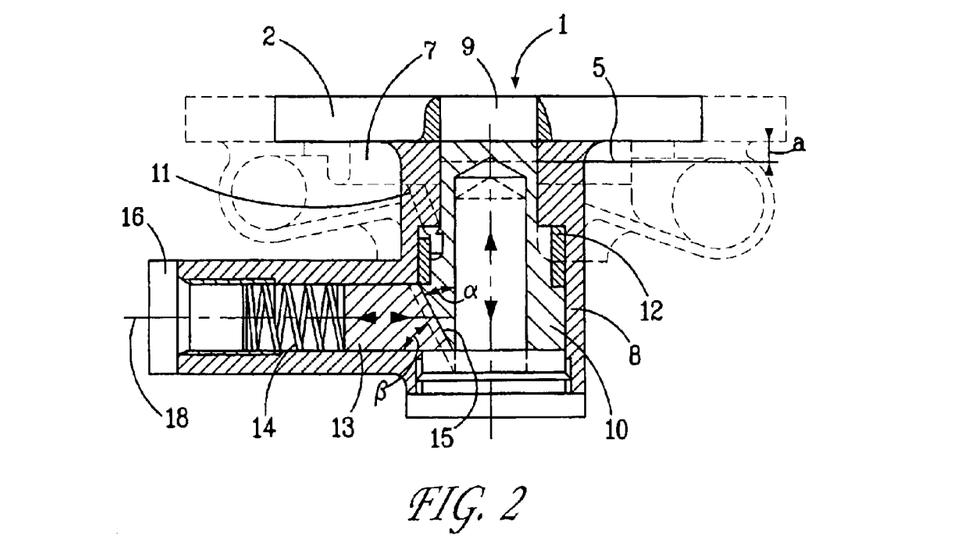
FIG. 2 is a section along the line A—A in FIG. 1.

FIG. 2 shows a section of the pump 1, along the Line A—A in FIG. 1. A suction region 5 and a pressure region 7 are arranged in a pump housing 8. The suction region 5 and the pressure region 7 are shielded from each other firmly through an axially displaceable control piston 10, that limits/defines a supply chamber 9. The pressure region 7 has a pressure regulation channel 11 that is connected to the waist 12 of the control piston 10. The control piston works in tandem with a plunger 13 at the control piston 10 end facing the supply chamber 9. The plunger 13 is aligned at right angles to the control piston 10. The consequence of the cooperation between the control piston 10 and the plunger 13 is that the plunger 13 is pre-tensioned against the control piston 10 with the help of a pressure spring 14. The control piston 10 and the plunger 13 are connected through a sliding surface 15 aligned at an angle to the axis of the control piston.

A definite path/displacement ratio can be predicted between the control piston 10 and the plunger 15 by using an oblique surface 15. As it is desirable that from a threshold speed onwards, the pressure and supply volumes are maintained at a near constant level, the model conforming to the invention ensures that if the threshold speed is exceeded, i.e., when there is a threshold pressure in the pressure region, the pressure of the supply medium of the pressure region 7 impacts against the waist 12 of the control piston 10 through the pressure regulation channel 11, and moves it in the opposite direction against the pressure spring 14.

When the control piston moves back, the axial play is enlarged, so that the supply medium (oil) can flow from the pressure region 7 to the suction region 5. This way the efficiency of the pump is lowered simultaneously, so that the pressure and volume flows remain constant. The backward displacement of the control piston 10, which corresponds to the enlargement of the axial play, can be bigger than the length of the spring in the pressure spring 14, so that the pressure and the volume flow from the regulation point can be maintained at constant levels.

The control piston 10 has an oblique surface 15 at an angle of 30° to the control piston axis 17. Similarly, the plunger axis 13 has an oblique surface at an angle of 60° to the plunger axis 18. Thus, a path/displacement ratio of 2:1 between the control piston 10 and the plunger 14 is established. The angle α between the oblique surface of the control piston 10 and the control piston axis 17 should have a value of 10° to 80°, and the angle β between the oblique surface of the plunger 13 and the plunger axis 18 should be 90°-α. By extending the oblique surfaces of the control piston and plunger 13 appropriately, it is possible establish a convenient path/displacement ratio, and thus ensure a suitably adapted regulated behavior on the part of the pump.

A more accurate design of the characteristic curve of the pump 1 is achieved by making the sliding surface 15 curved. The sliding surface of the control piston 10 can, for example, be made convex, so that with increasing speed, an above proportion enlargement of axial play can take place. This way the supply characteristic curve/line can be matched to the oil feed characteristic curve/line of the engine optimally.

Figure 3:
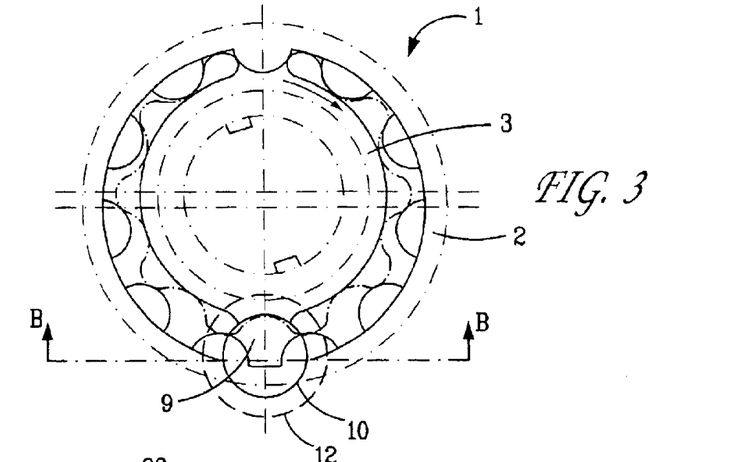
FIG. 3 is a top view of an initial design of a pump conforming to the invention.

FIG. 3 shows a top view of an initial design of the pump 1, particularly an oil pump for internal combustion engines having a rotor assembly designed as a gerotor comprising an outer rotor 2 and an inner rotor 3. The control piston 10, or the waist 12 of the control piston, is represented by broken lines (dashes). The supply chamber 9 is limited/defined by the outer rotor 2, the inner rotor 3 and the control piston 10.

Figure 4:
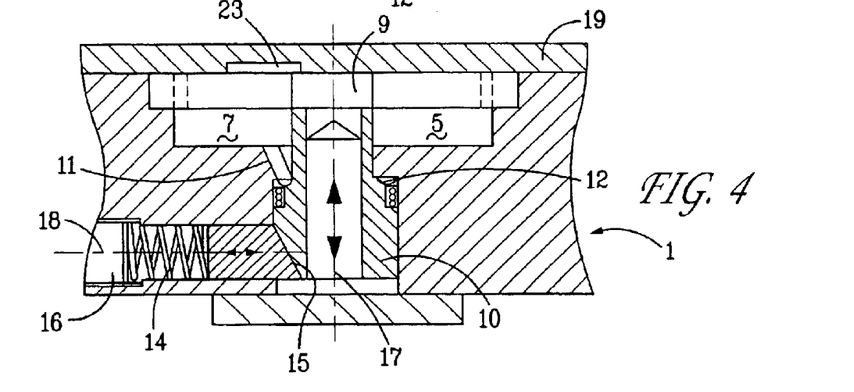
FIG. 4 is a section along the line B—B in FIG. 3 without axial play.

FIG. 4 shows a section of an initial design of the pump 1 conforming to the invention along the line B—B in FIG. 3. The pressure region 7 and the suction regions 5 are sealed securely from each other with the help of an axially displaceable control piston that limits/defines a supply chamber 9. There is a pressure channel from the pressure region to the waist 12 of the control piston 10. A ringed groove is built in the waist.

The control piston 10 has an oblique surface 15 at its end facing the supply chamber that is aligned at an angle of 30° to the control piston axis 17. At the represented position, the pressure in the pressure region 7 is well below the threshold pressure at the regulation point, so that the control piston is closed and there is no axial play. The regulation point of the pump has a pressure spring 14 that can be adjusted with the help of a screw 16.

Figure 5:
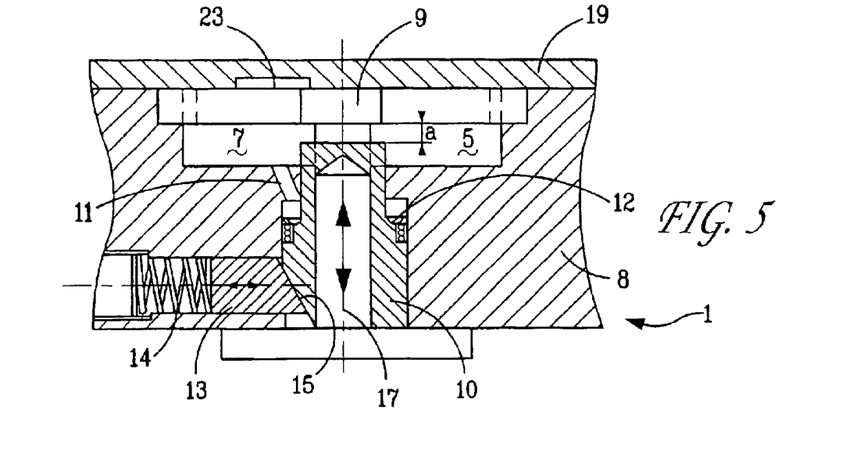
FIG. 5 is a section along the line B—B in FIG. 3 with axial play.

FIG. 5 shows a section through an initial design of a pump conforming to the invention along the Line B—B in FIG. 3. FIG. 5 shows the control piston 10 in a de-linked position in which there is axial play. From a threshold speed onwards, if the threshold speed is reached in the pressure region 7, the power of the pressure spring 14 is overcome and the pressure of the pressure medium is directed to the waist 12 of the control piston 10 through the pressure regulation channel 11. A ring groove is provided in the control piston waist 12 for better pressure distribution, and so that the pressure can reach the entire waist surface. A sealing bar is provided to ensure that the control piston 10 is sealed from the housing 8. If the control piston 10 is moved backwards against the plunger 13, the control piston 10 experiences a displacement in the path ratio 2:1 to the plunger 13, on account of the oblique sliding surface 15 aligned at an angle of 30° to the control piston axis.

Due to the axial play, the medium can flow into the suction region 5 from the pressure region 7 and the supply chamber 9. This brings down the efficiency of the pump in a controlled manner. This measure ensures that from the regulation point, the pressure and volume flow of the pump remains near constant in relation to speed, so that the supply curve of the pump approximates the oil feed curve of the engine.

Figure 6:
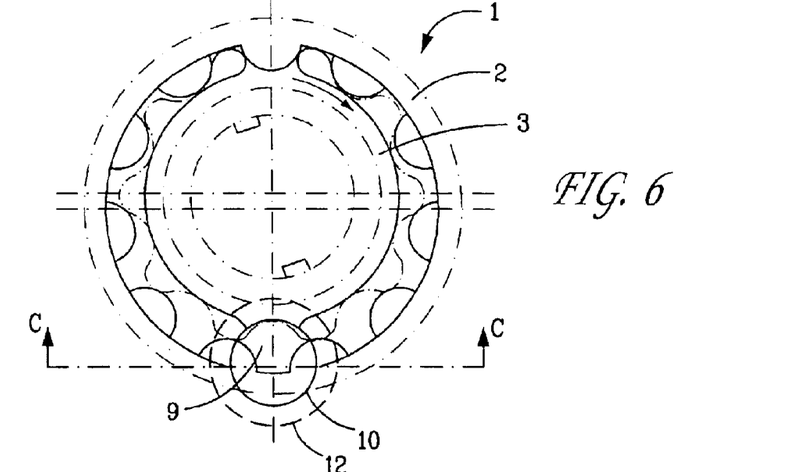
FIG. 6 is a top view of a second design of a pump conforming to the invention.

FIG. 6 shows a top view of an alternative embodiment of the pump 1, in particular an oil pump for internal combustion engines having a rotor assembly designed as a gerotor comprising an outer rotor 2 and an inner rotor 3. The control piston 10, or the control piston waist 12 is represented by broken lines (dashes).

The supply chamber 9 is limited/defined by the outer rotor 2, the inner rotor 3 and the control piston 10.

Figure 7:
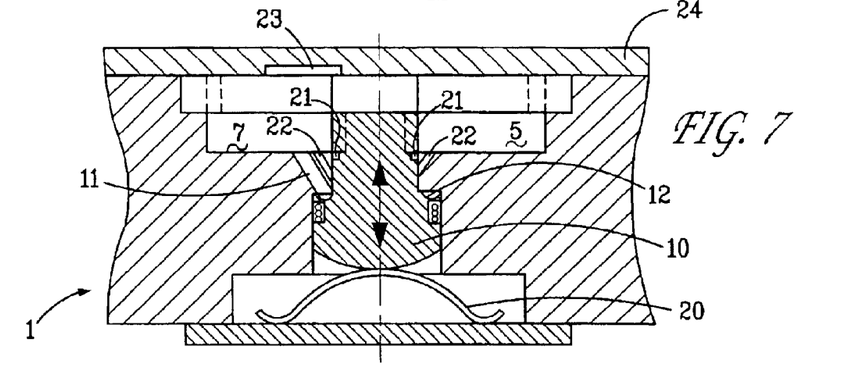
FIG. 7 is a section along the line C—C in FIG. 6 without axial play.

FIG. 7 shows a section of the alternative embodiment of the pump 1 conforming to the invention along the line C—C in FIG. 6. The alternative embodiment of the pump 1 is different from the embodiment shown in FIGS. 4 to 5 to the extent that the control piston 10 impacts on a spring with a non-linear spring curve built as a feather spring. By using such a spring with a non-linear spring curve, particularly a digressive spring curve, the axial play "a" can be improved in relation to increasing speed and thus, increasing pressure. This brings the supply curve of the pump considerably closer to the oil feed curve of the engine. This design is also advantageous because it permits a flat and ergonomic construction of the pump 1.

Figure 8:
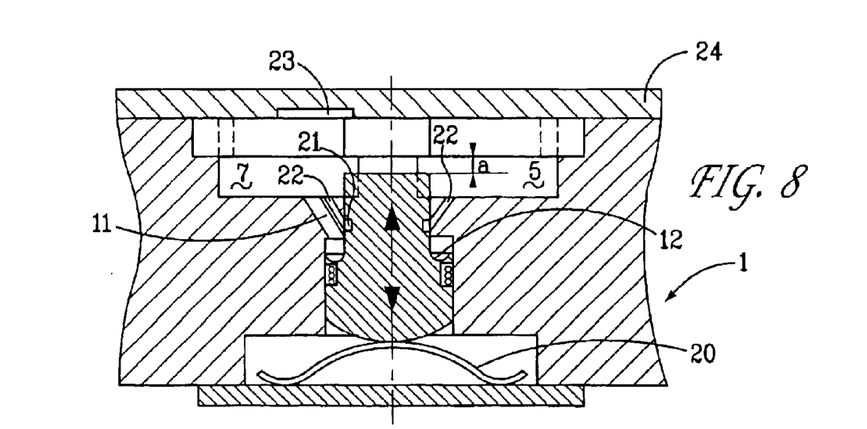
FIG. 8 is a section along the line C—C in FIG. 6 with axial play.

FIG. 8, which also displays a section of the pump along the Line C—C in FIG. 6, shows a control piston 10 in the withdrawn position, so that the supply medium can flow from the pressure region 7 to the suction region 5 on account of the axial play "a." In addition to the medium balancing, there is a pressure balancing from the pressure region to the suction region through the bypass channels 22, strengthened by the ring groove on the outer surface of the control piston 10.

The regulated behavior of the pump proves to be further advantageous in that the housing cover 24 has a pressure channel 23 that connects the pressure region 7 to the supply chamber 9. The pressure chamber 9 can be impacted with pressure flowing in through the pressure channel 23 built in the housing cover 24 in a controlled manner. The pressure channel 23 connects the pressure region 7 with the supply chamber 9 so that the supply chamber 9 is partially filled with the supply medium from the pressure region 7.

The consequence is that for an enlarged axial play "A", i.e., when the control piston 10 is withdrawn, the supply medium can flow back into suction region without any resistance, or it remains in the suction region. In this way, only the amount of supply medium (oil) required in accordance with the oil suction curve is pumped.

To influence the regulated behavior of the pump more accurately and in a more controlled manner, it is possible to block/regulate the pressure channels 11 and 23 so that for example, the pressure channel 23 remains closed up to a certain speed or pressure in the pressure region. This way, a pressure balancing can be effected from the pressure region 7 to the supply chamber 9. Further, it may be expedient if the invention designs shown in FIGS. 4 and 5 as well as FIGS. 7 and 8 are also provided on the opposite side of the control piston 10. This enables a better and improved regulation of the pump 1. For example, the second control piston can be provided with a spring having a different characteristic curve than that of the first control piston. The second control piston can also be provided with a spring that is pre-tensioned to such an extent that the control piston becomes effective only at pressures that are higher than the threshold pressure of the control piston of the first design.

Figure 9:
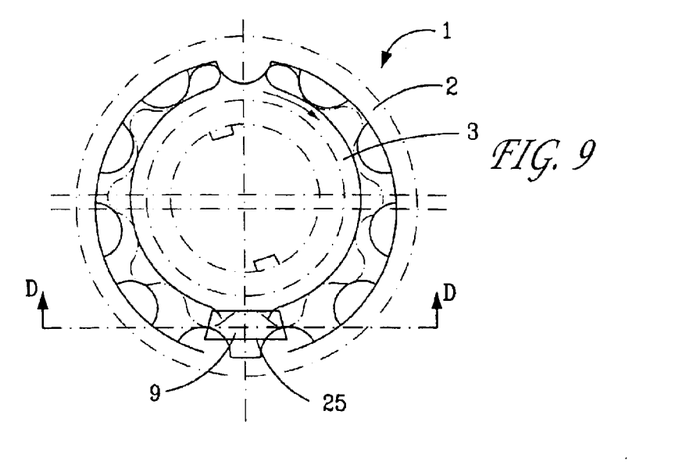
FIG. 9 is a top view of a third design of a pump conforming to the invention.

FIG. 9 shows the top view of a second alternative embodiment of the pump 1, particularly an oil pump for internal combustion engines having a rotor assembly designed as a gerotor comprising an outer rotor 2 and an inner rotor 3. The supply chamber 9 is limited/defined by the outer rotor 2 and the inner rotor 3, as well as by the sealing bar and a sliding block 25.

Figure 10:
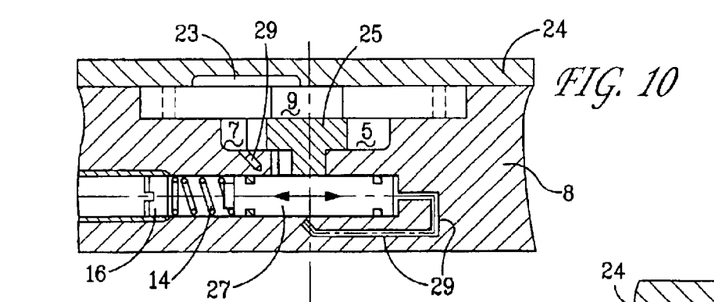
FIG. 10 is a section along the line D—D in FIG. 9 with closed sliding block.

FIG. 10 displays a section of the second alternative embodiment of the pump 1 conforming to the invention, along the line D—D in FIG. 9 with a closed sliding block. The pressure region 7 and the suction region 5 are sealed from each other firmly by a tangentially displaceable sliding block that defines/limits a supply chamber. The sliding block could also be displaced radially.

The sealing bar is partly replaced by a sliding block 25. The sliding block is built into the sealing bar in such a way that it can move, so that in the exit position, the suction region is separated from the pressure region. The sliding block 25 is screwed tightly to a hydraulic piston 27 aligned at right angles to the drive axis. The threshold pressure is adjusted with the help of a pre-tensioned pressure spring 14 that impacts on the hydraulic piston 27. In the represented position, the pressure in the pressure region 7 is well below the threshold pressure at the regulation point, so that the hydraulic piston 27 is closed and there is no aperture 'b'. The regulation point of the pump is pre-defined through a pressure spring 14, which can be adjusted with the help of a screw 16.

It is expedient if the pressure spring 14 has a digressive characteristic curve. If the threshold pressure is exceeded, the pressure is transmitted over the supply medium from the pressure region 7 through the pressure regulation channel 29 to the front surface of the hydraulic piston 27, and moves it against the spring tangentially to the drive shaft. This way the sliding block 25 that is connected to the hydraulic piston 27 is moved tangentially from the suction region 5 to the pressure region 7. The supply chamber 9, which is limited/defined by a gear assembly or a rotor assembly, and axially defined/limited through the sealing bar, is opened more or less due to the tangential movement of the sliding block 25 from the suction region 5 to the pressure region 7.

The supply chamber 9 is impacted with pressure in a controlled manner through a pressure channel 23 built in the pump cover 24, which connects the pressure region 7 to the supply chamber 9. This way, the supply chamber 9 filled earlier in the suction region 5 is replaced in a controlled manner with supply medium from the pressure region 7 through the pressure channel 23, so that the excess supply medium can flow back into the suction region 5 through the supply chamber 9 opened by the sliding block 25 without any hindrance, or it remains in the suction region. An inner leakage is achieved in the pump through the displacement of the sliding block and this leakage has a controlled, negative influence on the volumetric efficiency of the pump, leading to a reduction in the pump input.

Figure 11:
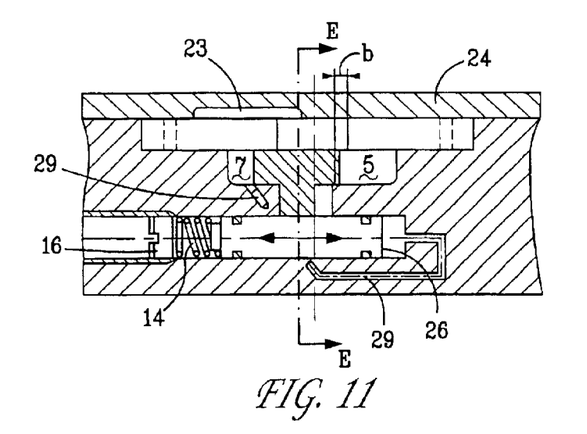
FIG. 11 is a section along the line D—D in FIG. 9 with open sliding block.

FIG. 11 displays a section of a third design of a pump 1 conforming to the invention along the line D—D in FIG. 9 with opened sliding block.

The pressure region 7 and the suction region 5 can be separated from each other through a radially displaceable sliding block 25 that limits/defines a supply chamber 9. There is a pressure channel 29 leading from the pressure region 7 to the front surface of the hydraulic piston 27. The sliding block 25 is in a detached position, so that there is an aperture "b". From a threshold speed onwards, when a threshold pressure is achieved in the pressure region 7, the power of the pressure spring 14 is overcome and the pressure of the supply medium flows to the waist 26 of the hydraulic piston 27 through the pressure regulation channel 29. A sealing is provided to insulate the hydraulic piston 27 from the housing 8.

The medium can flow from the pressure region 7 and the supply chamber 9 into the suction region 5 through the aperture "b." This has a controlled negative effect on the volumetric efficiency of the pump. This measure ensures that from the regulation point, the pressure and the volume flow of the pump 1 remains nearly constant in relation to the speed, so that the supply characteristic curve of the pump comes closer to the oil feed characteristic curve of the engine.

The characteristic curve of the pump is further influenced advantageously by the fact that the housing cover 24 has a pressure channel 23 that connects the pressure region 7 to the supply chamber 9. The supply chamber 9 can be impacted with pressure in a controlled manner through the pressure channel 23 built in the housing cover 24. The pressure channel 23 connects the pressure region 7 to the supply chamber 9, so that the supply chamber 9 is partly filled with supply medium from the pressure region 7.

Thus, in the case of an enlarged aperture "b", i.e., in case of a withdrawal of the sliding block 25, the supply medium can flow into the suction region without any resistance. In this way, only that much supply medium is pumped as is required by the oil feed characteristic curve of the engine.

Figure 12:
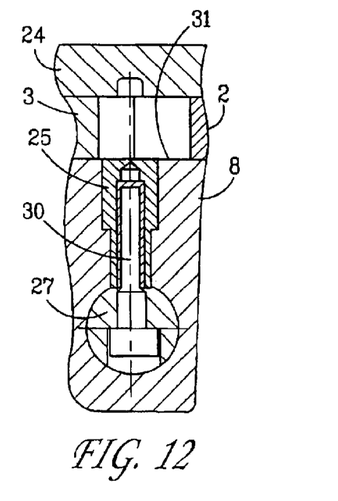
FIG. 12 is a section along the line E—E in FIG. 11.

FIG. 12 represents a section along the line E—E in FIG. 11 in which the sliding block 25 is screwed to the hydraulic piston 27 with the help of a screw 30. The supply chamber is limited/defined by the sliding block 25, the sealing bar 31, the outer rotor 2, the inner rotor 3 and the housing cover 24. There is a pressure channel 23 built in the housing cover 24, which connects the pressure region 7 to the supply chamber 9.

What is claimed is:

1. A pump comprising:
   a rotor assembly;
   a casing for housing the rotor assembly and having a pressure region and a suction region therein;
   a cover for mating with the casing;
   a control piston positioned within the casing, being movable in an axial direction in relation to the casing, and sealing the pressure region from the suction region, the control piston defining a supply chamber and having a contact surface positioned at an oblique angle in relation to an axial direction;
   a plunger positioned within the housing and being movable in relation to the housing in a direction substantially perpendicular to the axial direction; and
   a spring contacting the plunger and biasing the plunger toward the control piston so that the plunger contacts the contact surface of the control piston, wherein the casing has a pressure-regulation channel formed therein and extending between the pressure region and a waist of the control piston.

2. The pump of claim 1, wherein the contact surface has a curvilinear profile.

3. The pump of claim 1, wherein the casing has a first and a second bypass channel formed therein and adjoining the respective pressure and suction regions, and the control piston has a ring groove formed therein and adjoining the first and second bypass channels when the control piston is in a withdrawn position.

4. The pump of claim 1, wherein the cover has a pressure channel formed therein and extending between the pressure region and the supply chamber.

5. The pump of claim 4, wherein at least one of pressure regulation channel and the pressure channel can be at least one of blocked and regulated.

6. The pump of claim 1, wherein the control piston 10 has a wear-resistant surface.

7. The pump of claim 1, wherein the waist of the control piston has a groove formed therein.

8. The pump of claim 1, further comprising two of the pistons positioned on opposing sides of the casing.

9. A pump comprising:
   a rotor assembly;
   a casing for housing the rotor assembly and having a pressure region and a suction region therein;
   a cover for mating with the casing;
   a control piston positioned within the casing and being movable in an axial direction in relation to the casing, the control piston sealing the pressure region from the suction region and defining a supply chamber; and
   a spring having a non-linear spring rate and biasing the control piston in the axial direction, wherein the casing has a pressure-regulation channel formed therein and extending between the pressure region and a waist of the control piston.

10. The pump of claim 9, wherein the spring has a digressive spring rate.

11. The pump of claim 9, wherein the spring is a feather spring.

12. The pump of claim 9, wherein the spring is a plate spring.

13. The pump of claim 9, wherein the casing has a first and a second bypass channel formed therein and adjoining the respective pressure and suction regions, and the piston has a ring groove formed therein and adjoining the first and second bypass channels when the piston is in a withdrawn position.

14. The pump of claim 9, wherein the cover has a pressure channel formed therein and extending between the pressure region and the supply chamber.

15. The pump of claim 14, wherein at least one of pressure regulation channel and the pressure channel can be at least one of blocked and regulated.

16. The pump of claim 9, wherein the control piston 10 has a wear-resistant surface.

17. The pump of claim 9, wherein the waist of the control piston has a groove formed therein.

18. The pump of claim 9, further comprising two of the pistons positioned on opposing sides of the casing.

19. A pump comprising:
   a rotor assembly;
   a casing for housing the rotor assembly and having a pressure region and a suction region therein;
   a cover for mating with the casing;
   a sliding block positioned within the casing and movable in a radial direction in relation to the casing, the sliding block sealing the pressure region from the suction region;
   a piston fixedly coupled to the sliding block and movable in the radial direction; and
   a spring contacting the piston and biasing the piston in the radial direction, wherein the casing has a pressure-regulation channel formed therein and extending between the pressure region and a waist of the piston.

20. A pump comprising a rotor assembly, a casing for housing the rotor assembly and having a pressure region and a suction region therein, and a piston positioned within a bore of the casing and movable in an axial direction within the bore between a first and a second position, wherein:
   the pressure region is in fluid communication with the suction region when the piston is in the second position;

the piston substantially seals the pressure region from the suction region when the piston is in the first position;

the casing has a pressure-regulation channel formed therein and adjoining the pressure region and the bore so that the pressure region and the bore are in fluid communication; and a pressurized supply medium within the pressure region exerts a force on the piston by way of the pressure-regulation channel and the force causes the piston to move from the first position toward the second position when a pressure of the supply medium is greater than a predetermined value.

21. The pump of claim 20, further comprising a plunger positioned within the casing and being movable in relation to the casing, and a spring, wherein the piston has a contact surface positioned at a first oblique angle in relation to the axial direction and the spring biases the plunger toward the piston so that the plunger contacts the contact surface of the piston and urges the piston toward the first position.

22. The pump of claim 21, wherein the first oblique angle is within a range of approximately 10 degrees to approximately 80 degrees.

23. The pump of claim 22, wherein the plunger has a contact surface that contacts the contact surface of the piston, the contact surface of the plunger is oriented at a second oblique angle in relation to the axial direction, and a sum of the first and second oblique angles is approximately 90 degrees.

24. The pump of claim 21, wherein the first oblique angle is approximately 30 degrees.

25. The pump of claim 20, further comprising a spring having a non-linear spring rate and biasing the piston toward the first position.

26. A pump comprising a rotor assembly, a casing for housing the rotor assembly and having a pressure region and a suction region therein, a sliding block positioned within the casing, and a hydraulic piston fixedly coupled to the sliding block and positioned within a bore of the casing, the sliding block and the hydraulic piston being movable between a first and a second position within the casing, wherein:

the pressure region is in fluid communication with the suction region when the sliding block and the hydraulic piston are the second position;

the sliding block substantially seals the pressure region from the suction region when the sliding block and the hydraulic piston are in the first position;

the casing has a pressure-regulation channel formed therein and adjoining the pressure region and the bore so that the pressure region and the bore are in fluid communication; and a pressurized supply medium within the pressure region exerts a force on the hydraulic piston by way of the pressure-regulation channel and the force causes the hydraulic piston and the sliding block to move from the first position toward the second position when a pressure of the supply medium is greater than a predetermined value.

* * * * *